United States Patent [19]

Yale et al.

[11] Patent Number: 5,096,614

[45] Date of Patent: Mar. 17, 1992

[54] PROCESS FOR PRODUCING A TERBIUM-ACTIVATED GADOLINIUM OXYSULFIDE X-RAY PHOSPHOR WHEREIN THE GREEN/BLUE EMISSION RATIO IS CONTROLLED

[75] Inventors: Ramon L. Yale; Ronald E. Karam, both of Towanda

[73] Assignee: GTE Products Corporation, Stamford, Conn.

[21] Appl. No.: 325,732

[22] Filed: Mar. 20, 1989

[51] Int. Cl.$^5$ .............................................. C09K 11/84
[52] U.S. Cl. ............................................ 252/301.40 S
[58] Field of Search .................................. 252/301.4 S

[56] References Cited

U.S. PATENT DOCUMENTS

| | | | |
|---|---|---|---|
| 3,418,246 | 12/1968 | Royce | 252/301.4 S |
| 3,725,704 | 4/1973 | Buchanan et al. | 252/301.4 S |
| 3,868,533 | 2/1975 | Schvil | 252/301.4 S |
| 4,507,560 | 3/1985 | Mathers et al. | 252/301.4 S |
| 4,624,861 | 11/1986 | Yale et al. | 252/301.4 S |
| 4,694,217 | 9/1987 | Morita | 252/301.4 S |

*Primary Examiner*—Jack Cooper
*Attorney, Agent, or Firm*—L. Rita Quatrini; Donald R. Castle

[57] ABSTRACT

A process is disclosed for adjusting the green/blue emission ratio in a terbium-activated gadolinium oxysulfide x-ray phosphor, which comprises forming a uniform mixture of gadolinium oxide, sulfur, sodium carbonate, sodium hydrogen phosphate, and terbium oxide, firing the mixture in a closed vessel in an air atmosphere to form the phosphor, washing the phosphor with deionized water to remove essentially all of any water soluble impurities which are present, and deagglomerating and annealing the phosphor in air at a temperature of from about 400° C. to about 600° C. for a sufficient time to form the phosphor. The terbium concentration and firing temperature and firing time are controlled to attain the desired green/blue emission ratio. As the terbium concentration increases, the ratio increases. As the firing temperature and time increase, the ratio decreases.

3 Claims, 1 Drawing Sheet

PROCESS FOR PRODUCING A TERBIUM-ACTIVATED GADOLINIUM OXYSULFIDE X-RAY PHOSPHOR WHEREIN THE GREEN/BLUE EMISSION RATIO IS CONTROLLED

This invention relates to a process for adjusting the green/blue emission ratio of a terbium-activated gadolinium oxysulfide x-ray phosphor by control of the terbium level and the firing temperature.

BACKGROUND OF THE INVENTION

In the field of x-ray intensifier screens, it is sometimes desirable to adjust the green/blue emission ratio of the phosphor. In this way, the phosphor emission can be adjusted to the sensitivity of the film being used.

SUMMARY OF THE INVENTION

In accordance with one aspect of the invention, there is provided a process for adjusting the green/blue emission ratio in a terbium-activated gadolinium oxysulfide x-ray phosphor, which comprises forming a uniform mixture of gadolinium oxide, sulfur, sodium carbonate, sodium hydrogen phosphate, and terbium oxide, firing the mixture in a closed vessel in an air atmosphere to form the phosphor, washing the phosphor with deionized water to remove essentially all of any water soluble impurities which are present, and deagglomerating and annealing the phosphor in air at a temperature of from about 400° C. to about 600° C. The terbium concentration and firing temperature and firing time are controlled to attain the desired green/blue emission ratio. As the terbium concentration increases, the ratio increases. As the firing temperature and time increase, the ratio decreases.

DETAILED DESCRIPTION OF THE INVENTION

Figure 1:
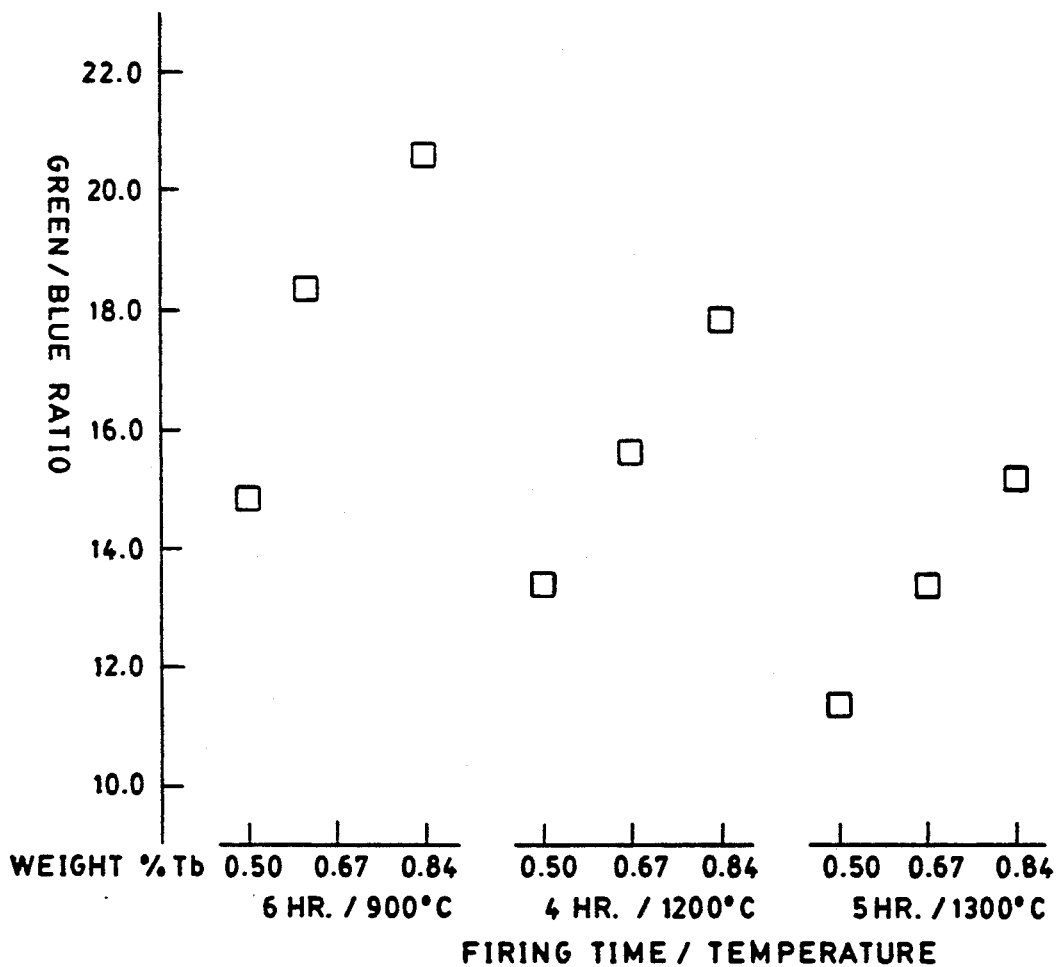
FIG. 1 is a plot of green/blue emission ratio versus weight % of terbium in the phosphor for various firing times and temperatures.

For a better understanding of the present invention, together with other and further objects, advantages, and capabilities thereof, reference is made to the following disclosure and appended claims in connection with the above described drawing and description of some of the aspects of the invention.

For various applications it is desirable to change the green/blue emission ratio of terbium-activated gadolinium oxysulfide phosphors over a broad range. This can be done according to the present invention by altering the terbiumactivator concentration and by controlling the severity of the firing conditions as will be described herein.

The green/blue emission ratio as used in the present invention is the ratio of the intensity of the 545 nanometer (green) spectral emission peak to the 418 nanometer (blue) spectral emission peak on x-ray excitation of the phosphor.

The phosphor is made by first forming a relatively uniform reating mixture from which the terbium-activated gadolinium oxysulfide is to be formed. They are gadolinium oxide, sulfur, sodium carbonate, sodium hydrogen phosphate, and terbium oxide. It is critical to this invention that the terbium oxide, $Tb_4O_7$, be provided in an amount sufficient to result in a terbium level which will result in the desired green/blue emission ratio. The higher the terbium concentration the higher will be the green/blue emission ratio as will be described.

The resulting admixture is fired in a closed vessel in air, which is normally ambient atmosphere to form the phosphor. The firing temperature and time are designed to result in the desired green/blue emission ratio.

At a given terbium concentration the ratio decreases as the severity of firing conditions increases, that is as the firing temperature and time increase. This trend is shown in FIG. 1 which is a plot of green/blue emission ratio versus firing conditions of temperature and time for given terbium concentrations.

In accordance with the present invention the following firing times and temperatures result in the following green/blue emission ratios at the given terbium concentrations in the phosphor.

In accordance with one embodiment, at a terbium concentration of from about 0.4% to about 0.6% by weight, a firing temperature of from about 850° C. to about 950° C. and a firing time of from about 5 hours to about 7 hours results in a green/blue emission ratio of from about 14 to about 16. The typical terbium concentration is about 0.5% by weight and the typical firing temperature and time is about 900° C. for about 6 hours.

In accordance with another embodiment, at terbium concentrations of from about 0.4% to about 0.6% by weight, a firing temperature of from about 1150° C. to about 1250° C. and a firing time of from about 3 hours to about 5 hours results in a green/blue emission ratio of from about 12 to about 14. The typical terbium concentration is about 0.5% by weight and the typical firing temperature and time is about 1200° C. for about 4 hours.

In accordance with another embodiment, at terbium concentrations of from about 0.4% to about 0.6% by weight, a firing temperature of from about 1250° C. to about 1350° C. and a firing time of from about 4 hours to about 6 hours results in a green/blue emission ratio of from about 11 to about 13. The typical terbium concentration is about 0.5% by weight and the typical firing temperature and time is about 1300° C. for about 5 hours.

In accordance with another embodiment, at a terbium concentration of from about 0.6% to about 0.75% by weight, a firing temperature of from about 850° C. to about 950° C. and a firing time of from about 5 hours to about 7 hours results in a green/blue emission ratio of from about 17 to about 19. The typical terbium concentration is about 0.67% by weight and the typical firing temperature and time is about 900° C. for about 6 hours.

In accordance with another embodiment, at terbium concentrations of from about 0.6% to about 0.75% by weight, a firing temperature of from about 1150° C. to about 1250° C. and a firing time of from about 3 hours to about 5 hours results in a green/blue emission ratio of from about 15 to about 17. The typical terbium concentration is about 0.67% by weight and the typical firing temperature and time is about 1200° C. for about 4 hours.

In accordance with another embodiment, at terbium concentrations of from about 0.6% to about 0.75% by weight, a firing temperature of from about 1250° C. to about 1350° C. and a firing time of from about 4 hours to about 6 hours results in a green/blue emission ratio of from about 12 to about 14. The typical terbium concentration is about 0.67% by weight and the typical firing temperature and time is about 1300° C. for about 5 hours.

In accordance with another embodiment, at terbium concentrations of from about 0.75% to about 0.95% by weight, a firing temperature of from about 850° C. to about 950° C. and a firing time of from about 5 hours to about 7 hours results in a green/blue emission ratio of from about 20 to about 22. The typical terbium concentration is about 0.84% by weight and the typical firing temperature and time is about 900° C. for about 6 hours.

In accordance with another embodiment, at terbium concentrations of from about 0.75% to about 0.95% by weight, a firing temperature of from about 1150° C. to about 1250° C. and a firing time of from about 3 hours to about 5 hours results in a green/blue emission ratio of from about 17 to about 19. The typical terbium concentration is about 0.84% by weight and the typical firing temperature and time is about 1200° C. for about 4 hours.

In accordance with another embodiment, at terbium concentrations of from about 0.75% to about 0.95% by weight, a firing temperature of from about 1250° C. to about 1350° C. and a firing time of from about 4 hours to about 6 hours results in a green/blue emission ratio of from about 14 to about 16. The typical terbium concentration is about 0.84% by weight and the typical firing temperature and time is about 1300° C. for about 5 hours.

The fired material is subjected to deagglomeration and washing steps as necessary. One such sequence of steps is described below.

The fired material which contains terbium-activated gadolinium oxysulfide is washed with deionized water to remove essentially all of any water soluble impurities which are present as by products of the reaction. This is done by slurry techniques which are familiar to those skilled in the art.

The resulting washed terbium-activated gadolinium oxysulfide is then deagglomerated. Deagglomeration can be done by wet milling. This is done typically by milling about 400 g of material with about 300 milliliters of deionized water per liter of the milling container with about 1 kilogram of milling media such as $\frac{1}{4}$" high density alumina balls. The milling is done typically in a one liter polypropylene container of about 3$\frac{1}{2}$" in diameter for about 30 minutes at about 80 rpm. Deagglomreation can be done also by dry milling the phosphor, after it has been washed and dried.

The resulting washed and milled phosphor is then annealed in air at a temperature of from about 400° C. to about 600° C. and preferably from about 525° C. to about 575° C. for a time of preferably from about 1 hour to about 3 hours and most preferably about 2 hours to form the final product phosphor.

As an example of one of the advantages of the present invention, while there are several ways to adjust particle size, such as with various levels of fluxes, the particle size is frequently controlled by controlling the firing or heating conditions used during phosphor synthesis. Higher firing temperatures and longer firing times result in larger particle sizes. However, altering firing conditions alters the green/blue emission ratio at a given terbium concentration. Also, brightness is affected by firing conditions. Therefore greater flexibility is afforded by the present invention to control the green/blue emission ratio when firing conditions must be restricted. Conversely, if the terbium activator concentration must be limited for any reason, then the firing time and temperature can be adjusted to still attain the desired green/blue emission ratio. It is believed that with increased firing temperature and time, that the terbium ions are more randomly distributed throughout the phosphor crystal structure, thereby reducing the degree of energy transfer between the terbium atoms and hence resulting in a bluer emission (lower green/blue emission ratio). Higher terbium concentrations result in higher green/blue emission ratios since energy transfer between the atoms is enhanced.

FIG. 1 shows that the green/blue emission ratio of $Gd_2O_2S$:Tb can be adjusted by altering the firing conditions under which the phosphor is synthesized. While the effect of terbium concentration on the green/blue emission ratio is generally known, the effect of firing conditions to our knowledge has been heretofore unknown. As the distance between terbium atoms in the phosphor lattice decreases, which is the result of higher terbium concentrations, an energy transfer between terbium atoms can take place, resulting in a greener emission. This invention suggests that the distance between terbium atoms increases as the severity of the firing increases, that is, as the firing temperature increases or as the firing time increases or as both temperature and time increase. It is believed that this results from a greater degree of terbium randomization in the lattice at more severe firing conditions. Under milder firing conditions, that is at lower firing temperature or a combination of lower firing temperatures and times, the terbium atoms may be primarily less randomly distributed and be closer together. Under these mild conditions, the distance between many of the terbium atoms would be relatively small.

To more fully illustrate this invention, the folowing non-limiting example is presented. All parts, portions and percentages are by weight unless otherwise stated.

EXAMPLE

The following raw materials are weighed in the parts given below and thoroughly blended to result in the following % Tb in the finished phosphor

|  | .5% Tb | 0.67% Tb | 0.84% Tb |
| --- | --- | --- | --- |
| $Gd_2O_3$ | 360.3 | 359.6 | 358.8 |
| $Tb_4O_7$ | 2.243 | 2.991 | 3.73 |
| S | 208.0 | 208.0 | 208.0 |
| $Na_2CO_3$ (anhydrous) | 212.0 | 212.0 | 212.0 |
| $Na_2PO_4$ | 28.4 | 28.4 | 28.4 |

Samples of the raw materials are fired in air in covered crucibles at the temperatures and times shown in FIG. 1. The resultant fired material is cooled, pulverized, wet milled and thoroughly washed with deionized water to a conductivity of less than about 10 micromhos. The material is then filtered, dried and dry milled to enhance deagglomeration. The material is then annealed for about 2 hours at about 575° C. in air and seived through a 400 mesh screen. The emission ratios are given in FIG. 1.

While there has been shown and described what are at present considered the preferred embodiments of the invention, it will be obvious to those skilled in the art that various changes and modifications may be made therein without departing from the scope of the invention as defined by the appended claims.

What is claimed is:

1. A process for producing a terbium-activated gadolinium oxysulfide x-ray phosphor wherein the green/blue emission ratio is controlled by controlling the terbium concentration and the firing conditions, said process comprising:
   a) forming a uniform reacting mixture of gadolinium oxide, sulfur, sodium carbonate, sodium hydrogen phosphate, and terbium oxide wherein said terbium oxide is provided in an amount sufficient to result in a terbium concentration of from about 0.4% to about 0.6% by weight in the subsequently produced phosphor;
   b) firing said mixture in a closed vessel in an air atmosphere at a temperature of about 850° C. to about 950° C. for about 5 hours to about 7 hours to form said terbium-activated gadolinium oxysulfide phosphor wherein the green/blue emission ratio is from about 14 to about 16;
   c) washing said terbium-activated gadolinium oxysulfide with deionized water to remove essentially all of any water-soluble impurities which are present;
   d) deagglomerating the resulting washed phosphor; and
   e) annealing the resulting deagglomerated phosphor in air at a temperature of from about 400° C. to about 600° C.

2. A process for producing a terbium-activated gadolinium oxysulfide x-ray phosphor wherein the green/blue emission ratio is controlled by controlling the terbium concentration and the firing conditions, said process comprising:
   a) forming a uniform reacting mixture of gadolinium oxide, sulfur, sodium carbonate, sodium hydrogen phosphate, and terbium oxide wherein said terbium oxide is provided in an amount sufficient to result in a terbium concentration of from about 0.6% to about 0.75% by weight in the subsequently produced phosphor;
   b) firing said mixture in a closed vessel in an air atmosphere at a temperature of about 850° C. to about 950° C. for about 5 hours to about 7 hours to form said terbium-activated gadolinium oxysulfide phosphor wherein the green/blue emission ratio is from about 17 to about 19;
   c) washing said terbium-activated gadolinium oxysulfide with deionized water to remove essentially all of any water-soluble impurities which are present;
   d) deagglomerating the resulting washed phosphor; and
   e) annealing the resulting deagglomerated phosphor in air at a temperature of from about 400° C. to about 600° C.

3. A process for producing a terbium-activated gadolinium oxysulfide x-ray phosphor wherein the green/blue emission ratio is controlled by controlling the terbium concentration and the firing conditions, said process comprising:
   a) forming a uniform reacting mixture of gadolinium oxide, sulfur, sodium carbonate, sodium hydrogen phosphate, and terbium oxide wherein said terbium oxide is provided in an amount sufficient to result in a terbium concentration of from about 0.75% to about 0.95% by weight in the subsequently produced phosphor;
   b) firing said mixture in a closed vessel in an air atmosphere at a temperature of about 850° C. to about 950° C. for about 5 hours to about 7 hours to form said terbium-activated gadolinium oxysulfide phosphor wherein the green/blue emission ratio is from about 20 to about 22;
   c) washing said terbium-activated gadolinium oxysulfide with deionized water to remove essentially all of any water-soluble impurities which are present;
   d) deagglomerating the resulting washed phosphor; and
   e) annealing the resulting deagglomerated phosphor in air at a temperature of from about 400° C. to about 600° C.

* * * * *